(12) United States Patent
Wu et al.

(10) Patent No.: US 12,474,961 B2
(45) Date of Patent: Nov. 18, 2025

(54) COMPUTING DEVICE, OPERATION METHOD THEREOF, AND SYSTEM ON CHIP WITH DYNAMIC ARITHMETIC UNIT ALLOCATION BETWEEN DEEP LEARNING ACCELERATOR AND VECTOR PROCESSOR

(71) Applicants: Tzu-Yi Wu, Hsinchu County (TW); Ming-Hsun Sung, Hsinchu County (TW)

(72) Inventors: Tzu-Yi Wu, Hsinchu County (TW); Ming-Hsun Sung, Hsinchu County (TW)

(73) Assignee: ITE Tech. Inc., Hsinchu (TW)

( * ) Notice: Subject to any disclaimer, the term of this patent is extended or adjusted under 35 U.S.C. 154(b) by 442 days.

(21) Appl. No.: 18/156,357

(22) Filed: Jan. 18, 2023

(65) Prior Publication Data
US 2024/0061711 A1    Feb. 22, 2024

(30) Foreign Application Priority Data
Aug. 16, 2022   (TW) .................. 111130823

(51) Int. Cl.
*G06F 9/46*    (2006.01)
*G06F 9/48*    (2006.01)
(Continued)

(52) U.S. Cl.
CPC .......... *G06F 9/5027* (2013.01); *G06F 9/4881* (2013.01); *G06F 15/8053* (2013.01)

(58) Field of Classification Search
CPC ... G06F 9/5027; G06F 9/4881; G06F 15/8053
See application file for complete search history.

(56) References Cited

U.S. PATENT DOCUMENTS

2019/0266485 A1    8/2019    Singh et al.
2019/0378001 A1   12/2019    Litvak
2022/0197858 A1    6/2022    Drepper

FOREIGN PATENT DOCUMENTS

CN    111340224    6/2020
CN    111611087    9/2020
(Continued)

OTHER PUBLICATIONS

"Office Action of Taiwan Counterpart Application", issued on May 30, 2023, p. 1-p. 7.

*Primary Examiner* — Gregory A Kessler
(74) *Attorney, Agent, or Firm* — JCIPRNET

(57) ABSTRACT

A computing device, an operation method of the computing device, and a system on chip are provided. The computing device includes an operator and a resource allocation manager. The operator includes multiple arithmetic units. The resource allocation manager is coupled to the operator and allocates the arithmetic units to a deep learning accelerator and a vector processor for use according to an amount of calculation of the deep learning accelerator and an amount of calculation of the vector processor. The operator receives a first operation request and a second operation request from the deep learning accelerator and the vector processor respectively, uses a first arithmetic unit group of the arithmetic units to perform a calculation of the first operation request, and uses a second arithmetic unit group of the arithmetic units to perform a calculation of the second operation request according to an allocation result.

17 Claims, 3 Drawing Sheets

(51) Int. Cl.
*G06F 9/50* (2006.01)
*G06F 15/80* (2006.01)

(56) References Cited

FOREIGN PATENT DOCUMENTS

| | | |
|---|---|---|
| CN | 114064251 | 2/2022 |
| CN | 114781632 | 7/2022 |
| TW | 753036 | 1/2022 |

COMPUTING DEVICE, OPERATION METHOD THEREOF, AND SYSTEM ON CHIP WITH DYNAMIC ARITHMETIC UNIT ALLOCATION BETWEEN DEEP LEARNING ACCELERATOR AND VECTOR PROCESSOR

CROSS-REFERENCE TO RELATED APPLICATION

This application claims the priority benefit of Taiwan application serial no. 111130823, filed on Aug. 16, 2022. The entirety of the above-mentioned patent application is hereby incorporated by reference herein and made a part of this specification.

BACKGROUND

Technical Field

The disclosure relates to a computing architecture, and in particular to a computing device, an operation method of a computing device, and a system on chip.

Description of Related Art

In the early days, system on chip (SoC) was used for processes or switching devices that did not require much computing, such as microprocessors for home appliances, and these SoCs had microcontroller unit (MCU) with single instruction, single data (SISD) architecture. With the advancement of technology, terminal devices gradually require a larger amount of computation, so SoCs are further developed into multi-processor systems with parallel computing architecture, which can perform a large amount of mathematical calculations by executing a small number of instructions. These SoCs have MCUs or vector processors (VP) with single instruction, multiple data (SIMD) architecture.

When artificial intelligence (AI) technology, wearable devices, or edge computing started to be widely used, MCU (or VP) with SIMD architecture alone was not enough, so deep learning accelerator (DLA) was developed to meet specific computing patterns. This type of SoC has both a SIMD-based MCU (or VP) and a DLA, so that when performing neural network calculations, the DLA can accelerate the calculations, and when performing other calculations that are difficult to be compared to neural network calculations, the SIMD-based MCU (or VP) can be used to perform the calculations for a variety of applications.

However, traditionally, the hardware architectures of DLA and VP are designed independently and the number of arithmetic units to be used is determined at the time of chip design and production, which means that the computing power of the hardware is fixed. In addition, there is no concept of sharing the arithmetic units of DLA and VP, which may lead to the waste of circuit area. Therefore, the design of a computing device that can effectively accommodate the computing needs of both DLA and VP and save circuit area is one of the research topics in this field.

SUMMARY

The disclosure provides a computing device, an operation method of a computing device, and a system on chip, capable of dynamically allocating arithmetic units to DLA and VP for use, thereby flexibly accommodating the computing needs of both, while achieving the efficacy of saving electrical area, reducing power consumption, and efficiently completing calculations.

The computing device of the disclosure includes an operator and a resource allocation manager. The operator includes multiple arithmetic units. The resource allocation manager is coupled to the operator, and allocates the arithmetic units to a deep learning accelerator and a vector processor for use according to an amount of calculation of the deep learning accelerator and an amount of calculation of the vector processor. The operator receives a first operation request and a second operation request from the deep learning accelerator and the vector processor respectively, and according to an allocation result, performs a calculation of the first operation request using a first arithmetic unit group of the arithmetic units, and performs a calculation of the second operation request using a second arithmetic unit group of the arithmetic units.

An operation method of a computing device of the disclosure includes the following. Multiple arithmetic units are allocated to a deep learning accelerator and a vector processor for use according to an amount of calculation of the deep learning accelerator and an amount of calculation of the vector processor. A first operation request and a second operation request are received from the deep learning accelerator and the vector processor, respectively. According to an allocation result, a calculation of the first operation request is performed using a first arithmetic unit group of the arithmetic units, and a calculation of the second operation request is performed using a second arithmetic unit group of the arithmetic units.

A system on chip of the disclosure includes a deep learning accelerator, a vector processor, and a computing device. The computing device is coupled to the deep learning accelerator and the vector processor, and includes an operator and a resource allocation manager. The operator includes multiple arithmetic units. The resource allocation manager is coupled to the operator, and allocates the arithmetic units to the deep learning accelerator and the vector processor for use according to an amount of calculation of the deep learning accelerator and an amount of calculation of the vector processor. The operator receives a first operation request and a second operation request from the deep learning accelerator and the vector processor respectively, and according to an allocation result, performs a calculation of the first operation request using a first arithmetic unit group of the arithmetic units, and performs a calculation of the second operation request using a second arithmetic unit group of the arithmetic units.

Based on the above, the computing device, the operation method of the computing device, and the system on chip provided by the embodiments of the disclosure can allocate multiple arithmetic units to the DLA and the VP for use according to the amount of calculation of the DLA and the amount of calculation of the VP, and respectively receive the operation request from the DLA and the VP and perform the calculation of the received operation request using a corresponding arithmetic unit group according to the allocation result. In this way, the embodiments of the disclosure dynamically allocating the arithmetic units to the DLA and the VP for use, whereby the computing needs of both may be flexibly taken care of, while achieving the efficacy of saving electrical area, reducing power consumption, and efficiently completing calculations.

To make the aforementioned more comprehensible, several accompanied with drawings are described in detail as follows.

BRIEF DESCRIPTION OF THE DRAWING

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the know embodiments, a deep learning accelerator (DLA) is a hardware device with multiply-accumulate (MAC) and quantizer, and the number of multiply-accumulate and quantizer is decided at the time of chip design and production. Generally speaking, the more multiply-accumulates and quantizers the hardware is equipped with, the higher the computing power of the system and the shorter the time consumption when undergoing high load computing, but the relative size of the circuit will also become quite large. In addition, once the system enters low load computing, only a few multiply-accumulates and quantizers may be needed to maintain operation, i.e., the remaining multiply-accumulates and quantizers will be idle and continue to consume power. Thus, it is a difficult problem to allocate the right number of arithmetic units in a traditional DLA to provide the highest computing power while taking care of the overall power consumption of the system.

Furthermore, in the know embodiments, a vector processor (VP) is a hardware device with a mathematical computing unit consisting of basic mathematical calculations (e.g., multiplier, divider, adder, subtractor, shifter, comparator, etc.), and is the same as a conventional DLA, which also has a difficult combination of computing power and circuit area. In addition, VP is usually tied to the central processing unit (CPU) on the system, and the execution of instructions between the two is correlated. Therefore, once the vector instructions slow down, the execution of basic instructions may be delayed, resulting in system control delays or lagging.

With the rapid development of AI technology, wearable devices, and edge computing, the trend of having both DLA and VP on the SoC is inevitable. Therefore, for the system, the trade-off between computing power and circuit area and power consumption will be doubly influential. Therefore, it is the goal of all SoC research and development units to meet the requirements of computing speed while saving circuit area and power consumption to keep the system in standby for a long time.

Here, a detailed analysis of the mathematical unit of the DLA shows that a multiply-accumulate is composed of a multiplier and an adder, while a quantizer is composed of a multiplier, a shifter, and an adder. Obviously, the mathematical arithmetic unit of DLA and the mathematical arithmetic unit of VP have commonalities.

The computing device and system on chip disclosed in the following embodiments may effectively allocate arithmetic units to DLA and VP for use, and may flexibly accommodate the computing needs of both by dynamically adjusting the ratio of resources (i.e., arithmetic units) to achieve the efficacy of saving electrical area, reducing power consumption, and efficiently completing calculations.

Figure 1:
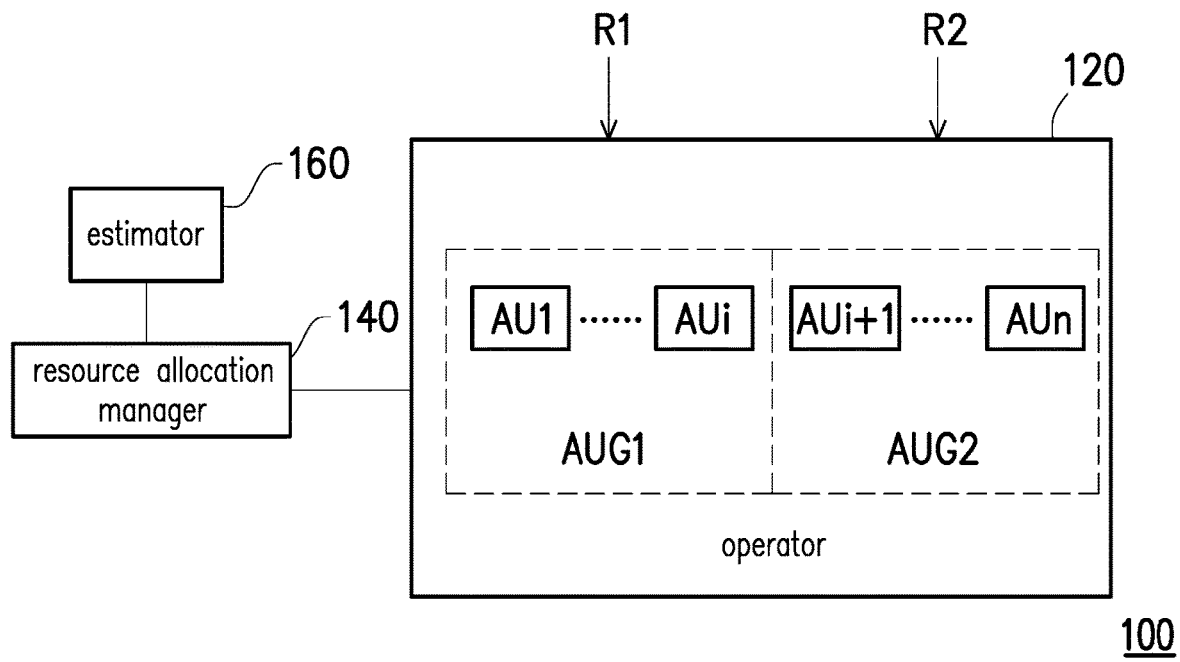
FIG. 1 is a schematic block diagram of a computing device according to an embodiment of the disclosure.

FIG. 1 is a schematic block diagram of a computing device according to an embodiment of the disclosure. Referring to FIG. 1, a computing device 100 includes an operator 120 and a resource allocation manager 140. The resource allocation manager 140 is coupled to the operator 120. The functions of the operator 120 and the resource allocation manager 140 according to this embodiment are described as follows.

The operator 120 according to this embodiment includes multiple arithmetic units AU1 to AUn, where n is any positive integer, and the embodiment of the disclosure does not limit the number of the arithmetic units. According to one embodiment, the arithmetic units AU1 to AUn are pooled into an arithmetic logic unit (ALU) pool, which are dynamically allocated or reallocated to a DLA and a VP for use, depending on demand. The arithmetic units AU1 to AUn calculate and analyze data in the DLA cache and VP vector registers. The arithmetic units AU1 to AUn are, for example, multipliers, dividers, adders, subtractors, shifters, comparators, or combinations thereof, and the embodiments of the disclosure are not limited thereto.

The resource allocation manager 140 according to this embodiment is, for example, a central processing unit (CPU), a microprocessor, an MCU, a digital signal processor (DSP), a programmable controller, a application specific integrated circuits (ASIC), a programmable logic device (PLD), or other similar devices (or a combination of these devices). Specifically, the resource allocation manager 140 may execute software (or firmware) programs to perform resource (i.e., arithmetic unit) allocation operations.

According to one embodiment, the computing device 100 further includes an estimator 160. The estimator 160 is coupled to the resource allocation manager 140 and estimates an amount of calculation of the DLA and an amount of calculation of the VP respectively before the resource allocation manager 140 performs the operation of resource (i.e., arithmetic unit) allocation. Specifically, the amount of calculation of DLA and the amount of calculation of VP may be expressed in terms of performance score. For example, rules for calculating performance score are as follows: one multiplication fraction accumulates 1, one division fraction accumulates 1, one addition fraction accumulates 1, one subtraction fraction accumulates 1, one displacement fraction accumulates 1, and one comparison fraction also accumulates 1, but the disclosure is not limited thereto.

Figure 2:
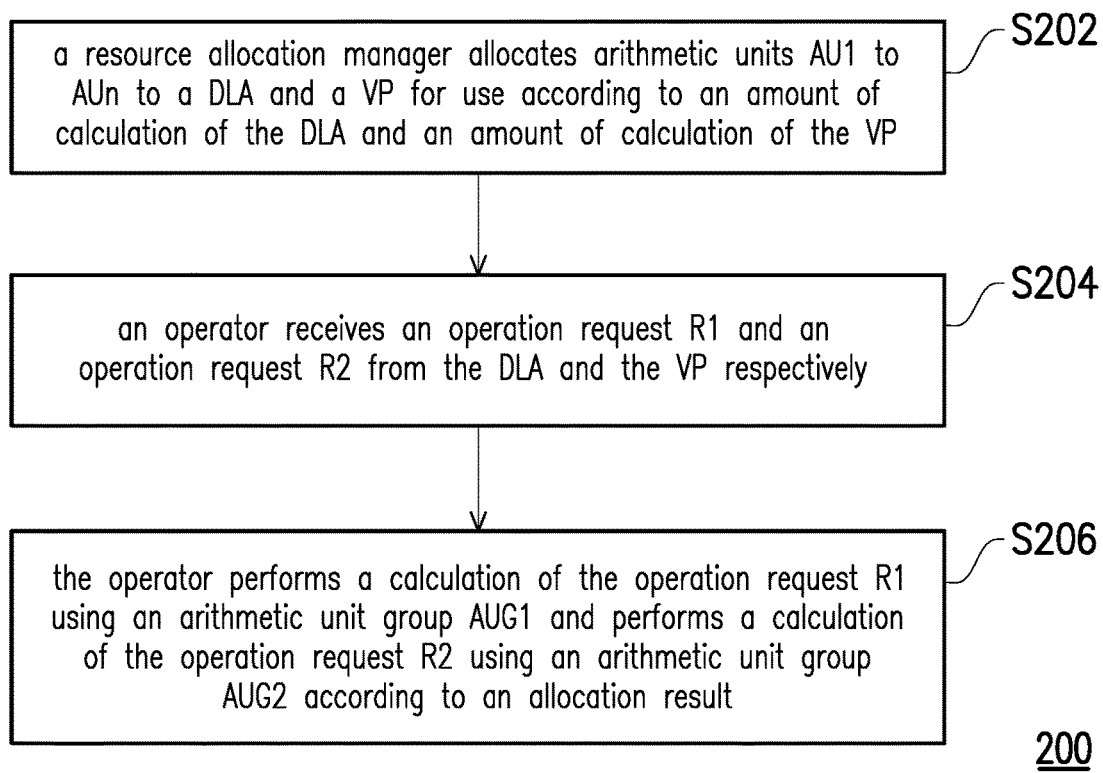
FIG. 2 is a schematic flowchart of an operation method of a computing device according to an embodiment of the disclosure.

FIG. 2 is a schematic flowchart of an operation method of a computing device according to an embodiment of the disclosure. Referring to FIG. 2, a method 200 according to this embodiment is applicable to the computing device 100 of FIG. 1. The following are the detailed steps of the operation method according to this embodiment with the various components of the computing device 100.

Referring to FIG. 1 and FIG. 2 at the same time, in step S202, the resource allocation manager 140 allocates the arithmetic units AU1 to AUn to the DLA and the VP for use according to the amount of calculation of the DLA and the amount of calculation of the VP. Specifically, the resource allocation manager 140 allocates an arithmetic unit group AUG1 to the DLA and allocates an arithmetic unit group AUG2 to the VP according to the ration between the amount of calculation of the DLA and the amount of calculation of the VP. Further, the arithmetic unit group AUG1 includes arithmetic units AU1 to AUi, and the arithmetic unit group AUG2 includes arithmetic units AUi+1 to AUn, with i being any positive integer.

According to one embodiment, the estimator 160 estimates the amount of calculation of DLA and the amount of calculation of VP respectively, and the amount of calculation of the DLA and the amount of calculation of the VP are expressed in terms of performance score. Next, the resource allocation manager 140 determines the allocation of the arithmetic units AU1 to AUn according to the ration between the performance score of the DLA and the performance score of the VP. The rules for calculating the performance score can be found in the description of the estimator 160 in FIG. 1 and will not be repeated in the following.

In step S204, the operator 120 receives an operation request R1 and an operation request R2 from the DLA and the VP, respectively. According to one embodiment, the operation request R1 includes information and input data for the arithmetic units required by the DLA, and the operation request R2 includes information and input data for the arithmetic units required by the VP.

In step S206, according to an allocation result of the resource allocation manager 140, the operator 120 performs a calculation of the operation request R1 using the arithmetic unit group AUG1 (i.e., the arithmetic units AU1 to AUi) of the arithmetic units AU1 to AUn, and performs a calculation of the operation request R2 using the arithmetic unit group AUG2 (i.e., the arithmetic units AUi+1 to AUn) of the arithmetic units AU1 to AUn.

The computing device 100 of the disclosure dynamically and efficiently allocates the arithmetic units to the DLA and the VP for use through the resource allocation manager 140 in the framework of shared mathematical arithmetic unit. In this way, the computing device 100 may flexibly accommodate the computing needs of the DLA and the VP, and at the same time achieve the efficacy of saving electrical area, reducing power consumption, and efficiently completing calculations.

Figure 3:
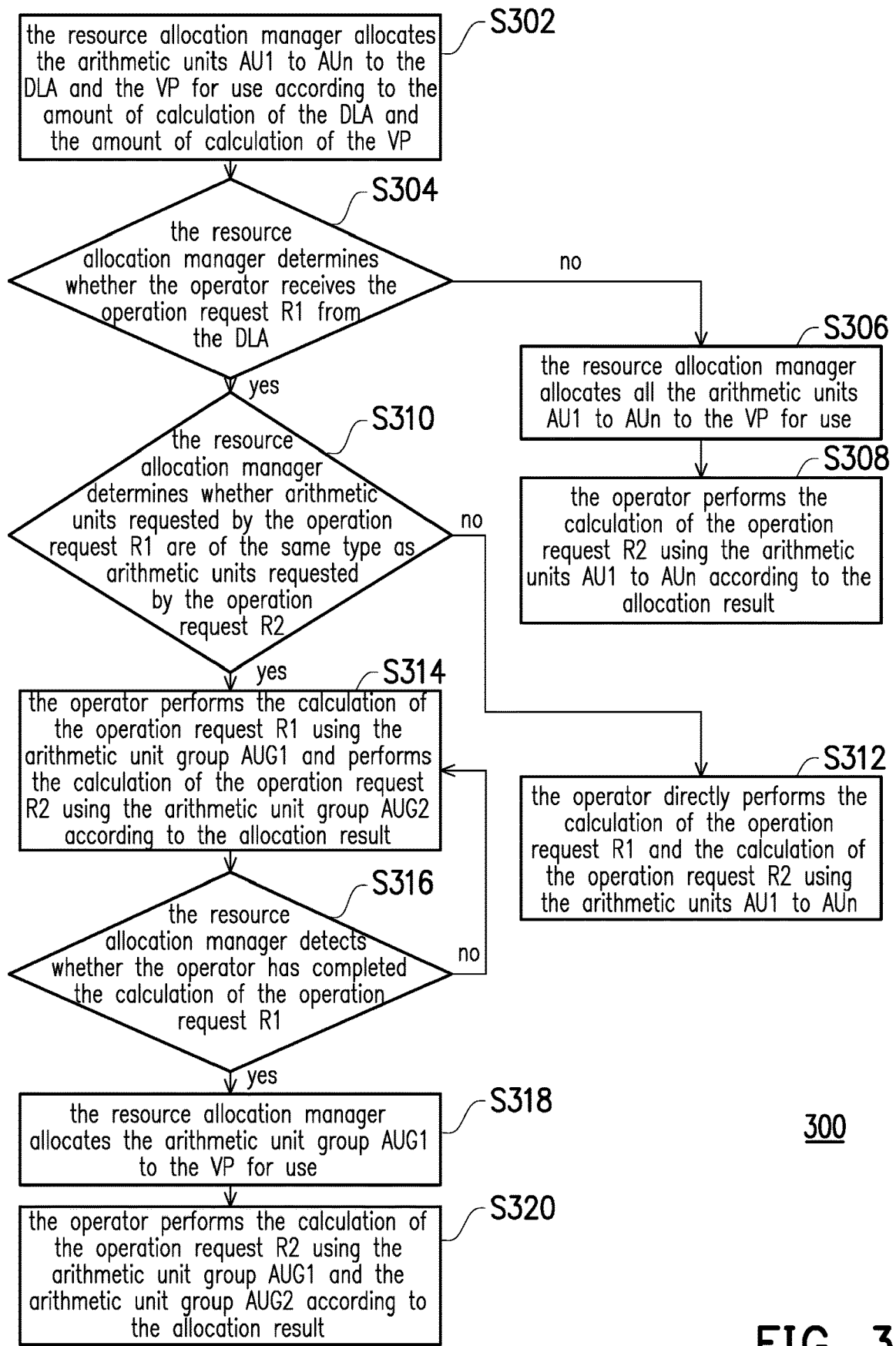
FIG. 3 is a schematic flowchart of an operation method of a computing device according to another embodiment of the disclosure.

FIG. 3 is a schematic flowchart of an operation method of a computing device according to another embodiment of the disclosure. Referring to FIG. 3, a method 300 according to this embodiment is applicable to the computing device 100 of FIG. 1. The following are the detailed steps of the operation method according to this embodiment with the various components of the computing device 100.

Referring to FIG. 1 and FIG. 3 at the same time, in step S302, the resource allocation manager 140 allocates the arithmetic units AU1 to AUn to the DLA and the VP for use according to the amount of calculation of the DLA and the amount of calculation of the VP. The step S302 according to this embodiment may be referred to the description of step S202 shown in FIG. 2, and therefore will not be repeated in the following.

In step S304, the resource allocation manager 140 determines whether the operator 120 receives the operation request R1 from the DLA. When the resource allocation manager 140 determines that the operator 120 is not receiving the operation request R1 from the DLA (a determination result of step S304 is "No"), the resource allocation manager 140 may proceed to step S306. In step S306, the resource allocation manager 140 allocates all the arithmetic units AU1 to AUn to the VP for use. Next, in step S308, the operator 120 performs the calculation of the operation request R2 using the arithmetic units AU1 to AUn according to the allocation result.

Returning to step S304, when the resource allocation manager 140 determines that the operator 120 receives the operation request R1 from the DLA (a determination result of step S304 is "Yes"), the resource allocation manager 140 may proceed to step S310. In step S310, the resource allocation manager 140 determines whether arithmetic units requested by the operation request R1 are of the same type as arithmetic units requested by the operation request R2. For example, when the arithmetic units required by the VP are subtractors and comparators, and the arithmetic units required by the DLA are multipliers, adders, and shifters, it means that the arithmetic units requested by the operation request R1 do not conflict with the arithmetic units requested by the operation request R2 (i.e. they are not of the same type). On the other hand, when the arithmetic units required by the VP are adders, comparators, and shifters, and the arithmetic units required by the DLA are multipliers, adders, and shifters, it means that the arithmetic units requested by the operation request R1 conflicts with the arithmetic units requested by the operation request R2 (i.e. they are of the same type).

When the resource allocation manager 140 determines that the arithmetic units requested by the operation request R1 are not of the same type as the arithmetic units requested by the operation request R2 (a determination result of step S310 is "No"), the operator 120 may proceed to step S312. In step S312, the operator 120 directly performs the calculation of the operation request R1 and the calculation of the operation request R2 using the arithmetic units AU1 to AUn. In particular, the term "direct . . . using . . . " means that the multiplier, adder, and shifter are all formed into a multiply-accumulate and a quantizer and provided to the DLA for use without considering the allocation result of the resource allocation manager 140, and other types of arithmetic units (such as subtractors, etc.) are provided to the VP for use.

Returning to step S310, when the resource allocation manager 140 determines that the arithmetic units requested by the operation request R1 are of the same type as the arithmetic units requested by the operation request R2 (the determination result of step S310 is "Yes"), the operator 120 may proceed to step S314. In step S314, according to the allocation result of the resource allocation manager 140, the operator 120 performs the calculation of the operation request R1 using the arithmetic unit group AUG1 of the arithmetic units AU1 to AUn, and performs the calculation of the operation request R2 using the arithmetic unit group AUG2 of the arithmetic units AU1 to AUn. The step S314 according to this embodiment may be referred to the description of step S206 shown in FIG. 2, and therefore will not be repeated in the following.

In step S316, the resource allocation manager 140 detects whether the operator 120 has completed the calculation of the operation request R1. When the resource allocation manager 140 detects that the operator 120 has completed the calculation of the operation request R1 (a determination result of step S316 is "Yes"), the resource allocation manager 140 may proceed to step S318. In step S318, the resource allocation manager 140 allocates the arithmetic unit group AUG1 to the VP for use. Next, in step S320, the operator 120 performs the calculation of the operation request R2 using the arithmetic unit group AUG1 and the arithmetic unit group AUG2 (i.e., the arithmetic units AU1 to AUn) according to the allocation result of the resource allocation manager 140. Thus, dynamically adjusting the ratio of resources (i.e., arithmetic units) also supports real-time recovery of arithmetic units. When the allocation manager 140 detects the termination of the DLA's arithmetic demand, it immediately recovers the arithmetic units and makes the recovered arithmetic units available to the VP.

Returning to step S316, when the resource allocation manager 140 detects that the operator 120 has not completed the calculation of the operation request R1 (the determination result of step S316 is "No"), the resource allocation manager 140 may repeat step S314 until the calculation of the operation request R1 and the operation request R2 is completed.

Figure 4:
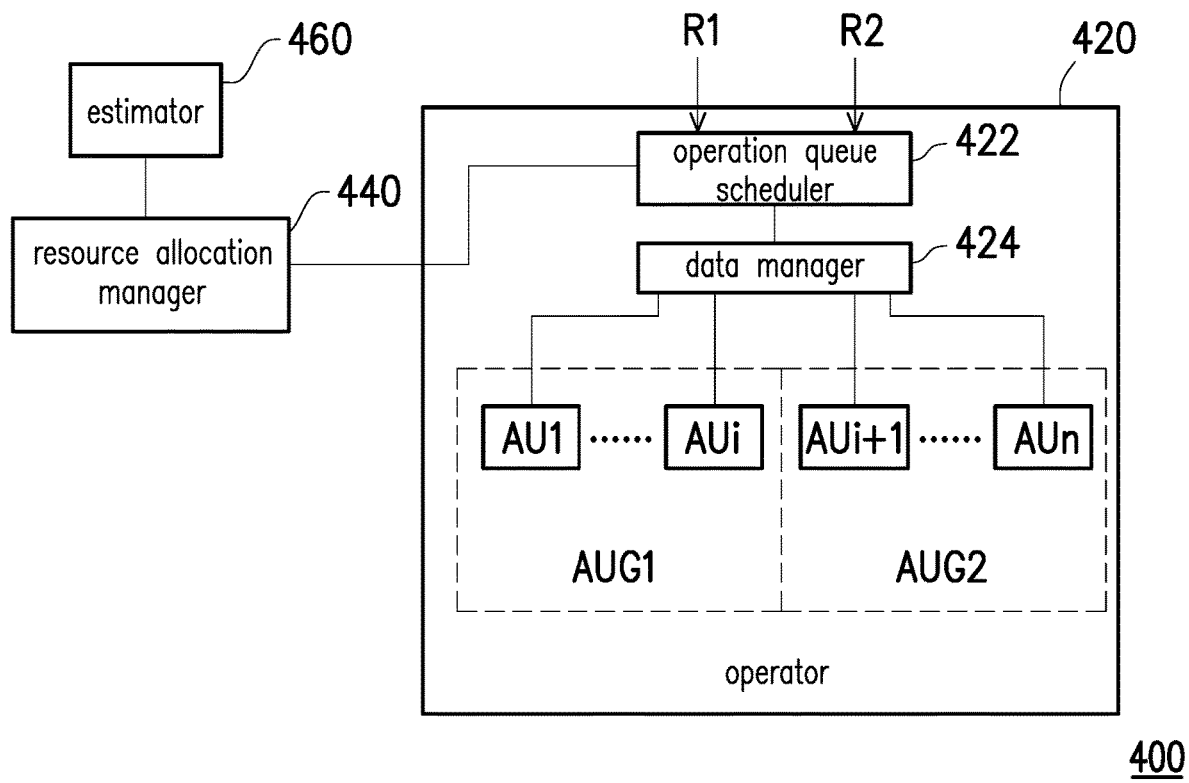
FIG. 4 is a schematic block diagram of a computing device according to another embodiment of the disclosure.

FIG. 4 is a schematic block diagram of a computing device according to another embodiment of the disclosure. Referring to FIG. 4, a computing device 400 includes an operator 420 and a resource allocation manager 440. According to one embodiment, the computing device 400 also includes an estimator 460. The computing device 400 shown in FIG. 4 may be analogous to the relevant description of the computing device 100 shown in FIG. 1. The computing device 400 according to this embodiment differs from the computing device 100 according to the embodiment of FIG. 1 in that the operator 420 of the computing device 400 further includes an operation queue scheduler 422 and a data manager 424. The functions of the operation queue scheduler 422 and the data manager 424 according to this embodiment are described as follows.

The operation queue scheduler 422 according to this embodiment is coupled to the resource allocation manager 440. Specifically, the operation queue scheduler 422 receives the operation request R1 and the operation request R2 from the DLA and the VP respectively, and schedules the operation request R1 and the operation request R2 according to an allocation result of the resource allocation manager 440.

The data manager 424 according to this embodiment is coupled to the operation queue scheduler 422 and the arithmetic units AU1 to AUn. Specifically, the data manager 424 receives the operation request R1 and the operation request R2 in sequence, and selects corresponding arithmetic units from the arithmetic unit group AUG1 and the arithmetic unit group AUG2 to perform a calculation. In addition, the data manager 424 transmits a calculation result back to the DLA or the VP through the operation queue scheduler 422.

Figure 5:
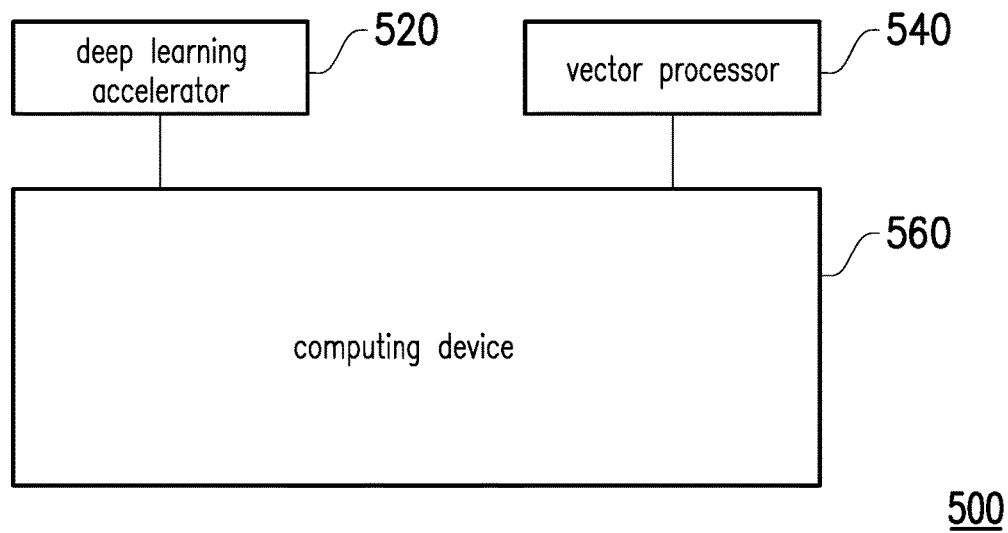
FIG. 5 is a schematic block diagram of a system on chip according to an embodiment of the disclosure.

FIG. 5 is a schematic block diagram of a system on chip according to an embodiment of the disclosure. Referring to FIG. 5, a system on chip 500 includes a DLA 520, a VP 540, and a computing device 560. The computing device 560 according to this embodiment is coupled to the DLA 520 and the VP 540. The computing device 560 shown in FIG. 5 may be analogous to the relevant description of the computing device 100 shown in FIG. 1. In addition, an operation method of the computing device 560 according to the embodiment of FIG. 5 may be referred to the operation method of the computing device 100 according to the embodiments of FIG. 2 and FIG. 3, and therefore will not be repeated in the following.

Compared with conventional designs, the computing device and the system on chip of this disclosure use the concept of sharing resources of mathematical arithmetic units, integrating all mathematical arithmetic units and planning them together, thus saving circuit area. In most cases where DLA and VP computing requirements do not overlap, this architecture may make more efficient use of mathematical arithmetic units, avoid wasteful idle computing units by adjusting the resource allocation, and reduce system power consumption, thus improving system heating. Therefore, the computing device and the system on chip of this disclosure may be widely applied to various AI technologies, wearable devices, or systems for edge computing.

It should be noted that the particular sequence and/or level of steps in the method according to the embodiments of the disclosure is only exemplary. Based on design preferences, a particular sequence or hierarchy of steps of the disclosed method or process may be rearranged while remaining within the scope of the embodiments of the disclosure. Accordingly, it will be understood by person having ordinary skill in the art that the methods and techniques according to the embodiments of the disclosure present various steps or actions in a sample sequence, and that the embodiments of the disclosure are not limited to the particular sequence or level presented, unless otherwise expressly stated.

To sum up, the computing device, the operation method of the computing device, and the system on chip provided by the embodiments of the disclosure can allocate multiple arithmetic units to the DLA and the VP for use according to the amount of calculation of the DLA and the amount of calculation of the VP, and respectively receive the operation request from the DLA and the VP and perform the calculation of the received operation request using a corresponding arithmetic unit group according to the allocation result. In this way, the embodiments of the disclosure dynamically allocating the arithmetic units to the DLA and the VP for use, whereby the computing needs of both may be flexibly taken care of, while achieving the efficacy of saving electrical area, reducing power consumption, and efficiently completing calculations.

It will be apparent to those skilled in the art that various modifications and variations can be made to the disclosed without departing from the scope or spirit of the disclosure. In view of the foregoing, it is intended that the disclosure covers modifications and variations provided that they fall within the scope of the following claims and their equivalents.

What is claimed is:

1. A computing device, comprising:
   an operator, comprising a plurality of arithmetic units;
   a resource allocation manager, coupled to the operator; and
   an estimator, coupled to the resource allocation manager,
   wherein the resource allocation manager is configured to allocate the arithmetic units to a deep learning accelerator and a vector processor for use according to an amount of calculation of the deep learning accelerator and an amount of calculation of the vector processor, wherein the amount of calculation of the deep learning accelerator and the amount of calculation of the vector processor are expressed in terms of performance score, and wherein the performance score is obtained according to an estimation by the estimator based on a plurality of arithmetic and/or logical operations,
   wherein the operator receives a first operation request and a second operation request from the deep learning accelerator and the vector processor respectively, and according to an allocation result from the resource allocation manager that determines assignment of the first arithmetic unit group to the deep learning accelerator and assignment of the second arithmetic unit group to the vector processor based on a ratio between the performance scores, performs a calculation of the first operation request using a first arithmetic unit group of the arithmetic units, and performs a calculation of the second operation request using a second arithmetic unit group of the arithmetic units.

2. The computing device according to claim 1, wherein the resource allocation manager determines whether the operator receives the first operation request from the deep learning accelerator, when the resource allocation manager determines that the operator is not receiving the first operation request from the deep learning accelerator, the resource allocation manager allocates all the arithmetic units to the vector processor for use.

3. The computing device according to claim 2, wherein when the resource allocation manager determines that the operator receives the first operation request from the deep learning accelerator, the resource allocation manager determines whether arithmetic units requested by the first operation request are of the same type as arithmetic units requested by the second operation request, when the resource allocation manager determines that the arithmetic units requested by the first operation request are not of the same type as the arithmetic units requested by the second operation request, the operator directly performs the calculation of the first operation request and the calculation of the second operation request using the arithmetic units.

4. The computing device according to claim 3, wherein when the resource allocation manager determines that the arithmetic units requested by the first operation request are of the same type as the arithmetic units requested by the second operation request, the operator performs the calculation of the first operation request using the first arithmetic unit group, and performs the calculation of the second operation request using the second arithmetic unit group according to the allocation result.

5. The computing device according to claim 1, wherein the resource allocation manager detects whether the operator has completed the calculation of the first operation request, when the resource allocation manager detects that the operator has completed the calculation of the first operation request, the resource allocation manager allocates the first arithmetic unit group to the vector processor for use.

6. The computing device according to claim 1, wherein the operator further comprises:

an operation queue scheduler, coupled to the resource allocation manager, and configured to schedule the first operation request and the second operation request according to the allocation result; and a data manager, coupled to the operation queue scheduler and the arithmetic units, and configured to receive the first operation request and the second operation request in sequence and select corresponding arithmetic units from the first arithmetic unit group and the second arithmetic unit group respectively to perform a calculation.

7. The computing device according to claim 6, wherein the data manager transmits a calculation result back to the deep learning accelerator or the vector processor through the operation queue scheduler.

8. The computing device according to claim 1, wherein the first operation request comprises information and input data for the arithmetic units required by the deep learning accelerator, and the second operation request comprises information and input data for the arithmetic units required by the vector processor.

9. An operation method of a computing device, adapted for a computing device comprising an operator having a plurality of arithmetic units pooled in an arithmetic logic unit (ALU) pool, and a resource allocation manager coupled to the operator, comprising:

estimating, by an estimator of the computing device, an amount of calculation of the deep learning accelerator and an amount of calculation of the vector processor, wherein the amount of calculation of the deep learning accelerator and the amount of calculation of the vector processor are expressed in terms of performance score, and wherein the performance score is obtained according to the estimation by the estimator based on a plurality of arithmetic and/or logical operations;

allocating, by the resource allocation manager, a plurality of arithmetic units to a deep learning accelerator and a vector processor for use according to the amount of calculation of the deep learning accelerator and the amount of calculation of the vector processor;

receiving, by the operator, a first operation request and a second operation request from the deep learning accelerator and the vector processor, respectively; and according to an allocation result from the resource allocation manager that determines assignment of the first arithmetic unit group to the deep learning accelerator and assignment of the second arithmetic unit group to the vector processor based on a ratio between the performance scores, performing, by the operator, a calculation of the first operation request using a first arithmetic unit group of the arithmetic units, and performing a calculation of the second operation request using a second arithmetic unit group of the arithmetic units.

10. The operation method according to claim 9, further comprising:

determining whether the first operation request is received from the deep learning accelerator, wherein when it is determined that the first operation request is not received from the deep learning accelerator, all the arithmetic units are allocated to the vector processor for use.

11. The operation method according to claim 10, wherein when it is determined that the operator receives the first operation request from the deep learning accelerator, whether arithmetic units requested by the first operation request are of the same type as arithmetic units requested by the second operation request is determined, wherein when it is determined that the arithmetic units requested by the first operation request are not of the same type as the arithmetic units requested by the second operation request, the calculation of the first operation request and the calculation of the second operation request are directly performed using the arithmetic units.

12. The operation method according to claim 11, wherein when it is determined that the arithmetic units requested by the first operation request are of the same type as the arithmetic units requested by the second operation request, the calculation of the first operation request is performed using the first arithmetic unit group, and the calculation of the second operation request is performed using the second arithmetic unit group according to the allocation result.

13. The operation method according to claim 9, wherein whether the calculation of the first operation request is completed is detected, wherein when it is detected that the calculation of the first operation request is completed, the first arithmetic unit group is allocated to the vector processor for use.

14. The operation method according to claim 9, further comprising:
scheduling the first operation request and the second operation request according to the allocation result; and
receiving the first operation request and the second operation request in sequence, and selecting corresponding arithmetic units from the first arithmetic unit group and the second arithmetic unit group respectively to perform a calculation.

15. The operation method according to claim 14, further comprising:
transmitting a calculation result back to the deep learning accelerator or the vector processor.

16. The operation method according to claim 9, wherein the first operation request comprises information and input data for the arithmetic units required by the deep learning accelerator, and the second operation request comprises information and input data for the arithmetic units required by the vector processor.

17. A system on chip, comprising:
a deep learning accelerator;
a vector processor; and
a computing device, coupled to the deep learning accelerator and the vector processor, and comprising:
an operator, comprising a plurality of arithmetic units;
a resource allocation manager, coupled to the operator; and
an estimator, coupled to the resource allocation manager,
wherein the resource allocation manager is configured to allocate the arithmetic units to the deep learning accelerator and the vector processor for use according to an amount of calculation of the deep learning accelerator and an amount of calculation of the vector processor, wherein the amount of calculation of the deep learning accelerator and the amount of calculation of the vector processor are expressed in terms of performance score, and wherein the performance score is obtained according to an estimation by the estimator based on a plurality of arithmetic and/or logical operations,
wherein the operator receives a first operation request and a second operation request from the deep learning accelerator and the vector processor respectively, and
according to an allocation result from the resource allocation manager that determines assignment of the first arithmetic unit group to the deep learning accelerator and assignment of the second arithmetic unit group to the vector processor based on a ratio between the performance scores, performs a calculation of the first operation request using a first arithmetic unit group of the arithmetic units, and performs a calculation of the second operation request using a second arithmetic unit group of the arithmetic units.

* * * * *